Aug. 19, 1958 P. A. NEWMAN 2,847,868
HYDRAULIC STEERING GEAR WITH A GEAR RACK
DISPOSED INTERMEDIATE PISTON HEADS
Filed Jan. 17, 1956 2 Sheets-Sheet 1
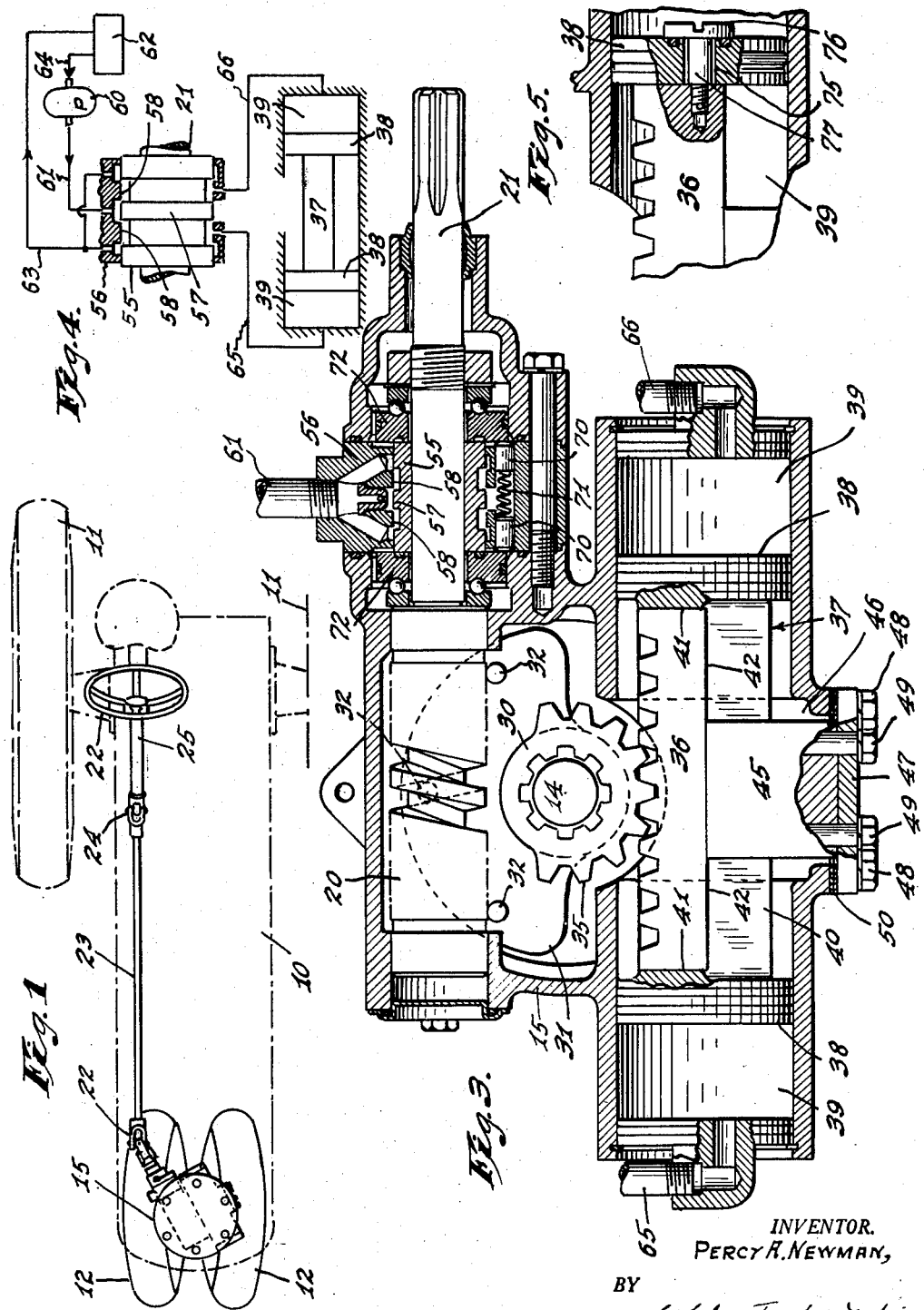
INVENTOR.
PERCY A. NEWMAN,
BY
ATTORNEYS.

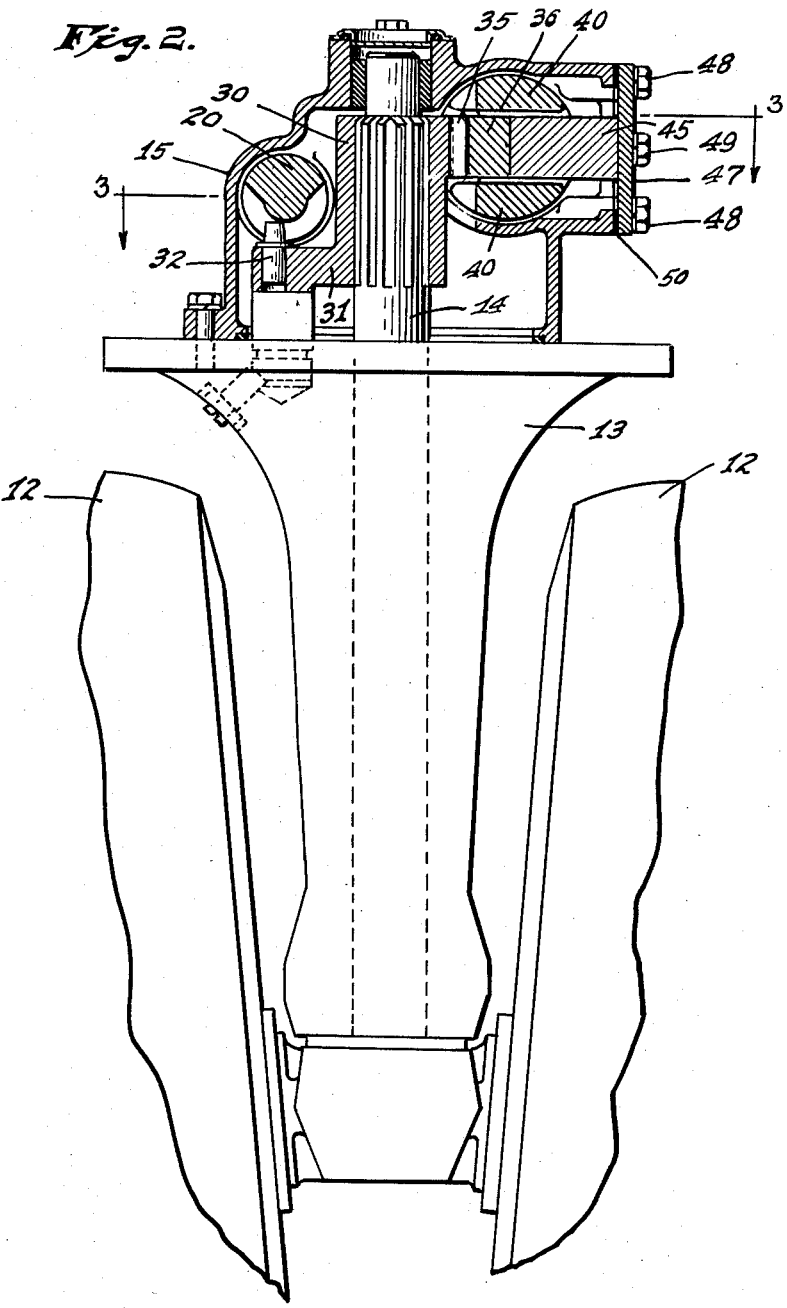

United States Patent Office 2,847,868
Patented Aug. 19, 1958

2,847,868

HYDRAULIC STEERING GEAR WITH A GEAR RACK DISPOSED INTERMEDIATE PISTON HEADS

Percy A. Newman, Lafayette, Ind., assignor to Ross Gear and Tool Company, Inc., Lafayette, Ind., a corporation of Indiana Application January 17, 1956, Serial No. 559,582

5 Claims. (Cl. 74—388)

Certain types of power steering gears for vehicles embody a rock shaft operatively connected to the dirigible wheel or wheels of the vehicle and connected through a rack and pinion mechanism with a hydraulic motor of the piston and cylinder type. One disadvantage of such arrangements as previously constructed arises from the fact that the reaction between the rack and pinion teeth imposes transverse loading on the piston or pistons of the hydraulic motor. It is therefore an object of this invention to provide a hydraulic steering gear with a rack and pinion mechanism so constructed as to eliminate the application of transverse load to the piston or pistons. A further object of the invention is to simplify and improve the construction of hydraulic steering gears.

In carrying out the invention in its preferred form, I embody a pair of opposed cylinders in which there reciprocates a rigid structure including a pair of pistons slidably received in the two cylinders. Such reciprocable structure carries a rack which meshes with a pinion mounted on the aforesaid rock shaft. The rack is so mounted in the reciprocable structure that it is free to move transversely of itself toward and away from the axis of the rock shaft, its movement away from the rock shaft being limited by a stationary bearing supported independently of the deciprocable structure. The reciprocable structure and the rack interengage over surfaces which are parallel to each other and perpendicular to the path of reciprocation, such surfaces transmitting between the rack and the reciprocating structure the thrust which the motor develops.

In the accompanying drawings, which illustrate one embodiment of the invention:

Fig. 1 is a plan view, somewhat diagrammatic in character, illustrating a row-crop tractor to which my improved steering gear is applied;

Fig. 2 is a fragmental front elevation of the tractor with portions of the steering gear broken away and illustrated in cross-section;

Fig. 3 is a section on the line 3—3 of Fig. 2;

Fig. 4 is a diagrammatic view illustrating the hydraulic system; and

Fig. 5 is a fragmental view similar to Fig. 3, but illustrating a modified construction.

While my invention may be applied to a wide variety of vehicles, I have shown it in the drawing as applied to a row-crop tractor 10 having rear drive wheels 11 and a pair of closely spaced front wheels 12 mounted for joint steering movement about a common vertical axis. The frame structure of the tractor embodies at its front end a downwardly extending housing 13 through which extends a vertical steering spindle 14 upon the lower end of which the wheels 12 are mounted. The upper end of the spindle 14 projects beyond the housing 13 and into a second housing 15 which contains the operative parts of the steering gear.

Mounted on a horizontal axis in the housing 15 at one side of the spindle 14 is a helical cam 20 having an integral shank or stem 21 adapted for connection to the conventional steering wheel 22. As shown, the shank 21 is connected through a universal joint 22 with an intermediate shaft 23 which extends generally longitudinally of the tractor and is connected at its rear end through a second universal joint 24 to the steering shaft 25 upon which the steering wheel 22 is secured.

Splined on the upper end of the spindle 14 is a sleeve 30 having near its lower end a laterally projecting arm 31 which bears one or more studs 32 receivable in the helical groove of the cam 20, thus providing a speed-reducing connection between the steering wheel 22 and the steering spindle 14. Near its upper end, the sleeve 30 carries a circumferentially extending series of gear teeth 35 forming a pinion or pinion sector which meshes with a rack 36 carried by a reciprocable structure designated in its entirety by the reference numeral 37. Such structure is formed at its ends to provide pistons 38 which are respectively slidable in opposed cylinders 39 formed in the housing 15, such two pistons being interconnected rigidly by a pair of vertically spaced struts 40. The rigid, reciprocable structure comprising the pistons 38 and the struts 40 is formed to receive the rack 36 in such a manner that the rack is free to move transversely of its extent and toward and away from the pinion 35 while being confined against movement longitudinally of itself. For this purpose, the rack 36, except for its pinion-engaging teeth has the form of a rectangular parallelepiped, and the structure 37 is broached or otherwise machined between the struts 40 to provide a first pair of parallel surfaces 41 which engage the ends of the rack to locate it longitudinally and a second pair of parallel surfaces 42 which engage the upper and lower surfaces of the rack to locate it vertically.

To hold the rack in proper meshing engagement with the pinion 35, I provide a bearing block 45 rigidly supported from the housing 15. For this purpose, the housing is provided on the opposite side of the rack 36 from the pinion 35 with an opening 46 having an associated closure 47 adapted to be secured against the side of the housing by screws 48. The bearing block 45 is secured against the inner face of the closure 47 by screws 49. Removable shims 50 interposed between the closure 47 and the housing 15 so locate the bearing block 45 along a radius of the spindle 14 that the inner end of the bearing block will engage the rack 36 and maintain it in proper meshing engagement with the pinion 35.

The specific valve mechanism shown in Figs. 3 and 4 for controlling the supply of pressure fluid to the cylinder 39 is of the well known open-center type. It comprises inner and outer telescoping valve members 55 and 56, the latter stationary and the former mounted in fixed axial position on the cam-shank 21 which, with the cam 20, has a limited freedom of axial movement in its mounting. The inner valve member 55 has two annular grooves defining an intermediate land 57, while the outer valve member has three annular grooves defining two axially spaced lands 58. In the normal or neutral position of the inner valve member 55, its land 57 is coplanar with the intermediate groove of the outer valve member 56 while its grooves are respectively coplanar with the two lands of the outer valve member. Each land is somewhat narrower than the groove with which it is coplanar so that when the inner valve member 55 is in its neutral position all the grooves are in communication with each other.

As will be clear from Fig. 4, the middle groove of the stationary valve member is connected with the discharge opening of a pump 60 by a conduit 61 while the end grooves are connected to a reservoir tank or sump 62 through a conduit 63. The sump is in turn connected to the inlet of the pump 60 through a conduit 64. The two lands in the outer valve member are provided with ports which, in cooperation with conduits 65 and 66, connect the two grooves of the inner valve member respectively with the outer ends of the two cylinders 39.

The inner valve member is biased toward its neutral position by pairs of plungers 70 mounted for axial sliding movement in the outer valve member 56. Between the two plungers 70 of each pair there operates a compression spring 71 which urges each plunger outwardly toward engagement both with a shoulder on the stationary valve housing and with a bearing race 72 axially movable with the cam 20 and the cam-shank 21. The space between the two plungers of each pair communicates with the valve inlet, so that hydraulic pressure aids the spring 71 in biasing the inner valve member toward neutral position.

When the inner valve member 55 is in its neutral position, pressure fluid entering the middle groove of the outer valve member 56 from the pump 60 divides at said inner groove and flows over the lands 57 and 58 to the outer grooves of the stationary valve member and thence through conduit 63 to the sump 62. The respective fluid pressures maintained in the cylinders 39 will correspond to the pressures in the grooves in the inner valve member 55; and in the neutral position of the inner valve member, those pressures will be equal and no net force will be applied to the reciprocable structure 37. However, if the inner valve member 55 is displaced from its neutral position, the pressures in its grooves will no longer be equal, unbalanced pressures will exist in the cylinders 39, and a moving effort will be applied to the reciprocable structure 37 for transmission through the rack 36 and pinion 35 to the steering spindle 14. Displacement of the inner valve member 55 from its neutral position results from the axial component of the reaction exerted by the studs 32 on the cam 20. For example, in the specific structure shown in the drawings, if the cam 20 is rotated in a direction to cause clockwise (Fig. 3) swinging of the spindle 14, the reaction imposed on the cam 20 will urge it to the left; and if such reaction is great enough to displace the cam against the centering effort exerted by the plungers 70, the cam will move to the left carrying the inner valve member 55 with it. As a result of leftward moving of the inner valve member 55, fluid pressure in its right-hand groove will increase and fluid pressure in its left-hand groove will decrease. Such pressure changes, transmitted to the respective cylinders 39, create an unbalanced fluid pressure on the reciprocable structure 37 which causes such structure to move to the left and apply a clockwise torque to the steering spindle.

The modification shown in Fig. 5 is identical with that previously described except that the pistons 38 are structurally independent of each other and are independently connected to the rack 36. For this purpose, each piston is provided with a central opening 75 through which a screw 76 extends into the rack 36. Each screw 76 is provided with a shoulder 77 which, by engagement with the end of the rack, prevents the screw from clamping the piston, and the hole 75 is made larger than the body of the screw, so that no lateral forces can be transmitted between either piston and the rack.

As indicated above, my invention is not concerned with details of any specific valve mechanism but rather is concerned with the means by which the rectilinearly reciprocable piston element of the hydraulic motor is connected to the steering spindle. In that means, all the side thrust resulting from reaction of the pinion 35 with the rack is transmitted directly to the bearing block 45, thus leaving the pistons free from transverse forces which would increase wear between the pistons and cylinders.

I claim as my invention:

1. In a hydraulic steering gear, a rock shaft, a pinion fixed to said shaft for rotation therewith, a reciprocable rack meshing with said pinion, a hydraulic motor having a reciprocable piston, a structure rigid with said piston operatively interconnecting the piston and rack, said rack and structure having interengaging thrust-transmitting faces disposed parallel to each other and perpendicular to the path of rack-reciprocation, said rack being translationally movable relative to said structure toward and away from said pinion, a stationary support, and means mounted in fixed position on said support beyond the limits of travel of said piston and engaging said rack only beyond the limits of travel of the piston to limit its movement away from the pinion.

2. The invention set forth in claim 1 with the addition that said motor comprises a pair of opposed cylinders in each of which a piston is reciprocable, said structure being rigid with both said pistons.

3. In a hydraulic steering gear, a housing including a pair of opposed cylinders, a rigid structure reciprocable in said cylinders and including pistons slidable respectively in the cylinders and a pair of spaced struts interconnecting said pistons, a rack extending longitudinally of said structure, a pinion meshing with said rack, said rack being disposed between said struts and being freely movable in said structure toward and away from said pinion, said rack and structure having interengaging thrust-transmitting faces extending transversely to the rack and preventing movement of the rack longitudinally of itself in said structure, and a stationary bearing member supported from said housing between the adjacent limits of travel of said pistons and engaging said rack only between such limits of piston travel to limit its movement away from said pinion.

4. In a hydraulic steering gear, a rock shaft, a pinion fixed to said shaft for rotation therewith, a reciprocable rack meshing with said pinion, a hydraulic motor having a reciprocable piston, thrust-transmitting means operably interconnecting said rack and piston for joint movement axially of the piston, said means permitting at least a limited movement of the rack perpendicular to the piston-axis and toward and away from said pinion, a stationary support, and means mounted in fixed position on said support beyond the limits of travel of said piston and engaging said rack only beyond the limits of travel of the piston to limit its movement away from the pinion.

5. In a hydraulic steering gear, a rock shaft, a pinion fixed to said shaft for rotation therewith, a reciprocable rack meshing with said pinion, a hydraulic motor having a reciprocable piston, said rack having a plane end face perpendicular to the piston-axis, said piston having a plane face engaging the end face of the piston and being provided with an opening, a shouldered screw extending through said opening and into said rack to interconnect the piston and rack for joint reciprocating movement while permitting the rack to move perpendicularly to the piston-axis toward and away from said pinion, a stationary support, and means mounted in fixed position on said support beyond the limits of travel of said piston and engaging said rack only beyond the limits of travel of the piston to limit its movement away from the pinion.

References Cited in the file of this patent
UNITED STATES PATENTS
2,492,649    MacDuff _____ Dec. 27, 1949